US010121109B2

(12) United States Patent
Beigi et al.

(10) Patent No.: US 10,121,109 B2
(45) Date of Patent: Nov. 6, 2018

(54) FLEXIBLE AND SELF-ADAPTIVE CLASSIFICATION OF RECEIVED AUDIO MEASUREMENTS IN A NETWORK ENVIRONMENT

(71) Applicant: International Business Machines Corporation, Armonk, NY (US)

(72) Inventors: Mandis S. Beigi, White Plains, NY (US); Seraphin B. Calo, White Plains, NY (US); Dinesh C. Verma, New Castle, NY (US); Shiqiang Wang, White Plains, NY (US); David A. Wood, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/481,554

(22) Filed: Apr. 7, 2017

(65) Prior Publication Data
US 2018/0293510 A1 Oct. 11, 2018

(51) Int. Cl.
*H04R 19/00* (2006.01)
*G06N 99/00* (2010.01)
*G06F 17/30* (2006.01)

(52) U.S. Cl.
CPC ..... *G06N 99/005* (2013.01); *G06F 17/30778* (2013.01)

(58) Field of Classification Search
USPC .... 381/1, 55, 56, 58, 61, 71.1, 71.12, 71.14, 381/150
See application file for complete search history.

(56) References Cited

U.S. PATENT DOCUMENTS

| 8,918,343 | B2 | 12/2014 | Mitchell |
| 9,286,911 | B2 * | 3/2016 | Mitchell ................. G10L 25/51 |
| 2005/0216430 | A1 * | 9/2005 | Marcjan ............ G06F 17/30067 |
| 2011/0213612 | A1 | 9/2011 | Zakarauskas et al. |

FOREIGN PATENT DOCUMENTS

| CN | 105069474 A | 11/2015 |
| KR | 1020110125968 A | 11/2011 |

* cited by examiner

*Primary Examiner* — Yosef K Laekemariam
(74) *Attorney, Agent, or Firm* — Garg Law Firm, PLLC; David M. Quinn

(57) ABSTRACT

A domain description is received, by a processor, the domain description identifying a domain associated with a sensor input. The domain description is formatted according to a hierarchical naming structure. A training data set is selected from a plurality of training data sets based upon the received domain description and sensor input. A combination of a subset of classifiers for classifying the sensor input is selected from a set of classifiers based upon the selected training data set.

13 Claims, 9 Drawing Sheets

FLEXIBLE AND SELF-ADAPTIVE CLASSIFICATION OF RECEIVED AUDIO MEASUREMENTS IN A NETWORK ENVIRONMENT

TECHNICAL FIELD

The present invention relates generally to a method, system, and computer program product for classification of received audio measurements in a network environment. More particularly, the present invention relates to a method, system, and computer program product for flexible and self-adaptive classification of received audio measurements in a network environment.

BACKGROUND

Hearing is a cognitive capability that humans use to diagnose problems and troubleshoot issues that arise in a variety of environments. For example, a human may listen to the sounds of an automobile engine to diagnose a problem with the engine. In another example, a human may hear a beeping sound in an indoor environment and determine that a fire alarm has been activate. However, there is little to no automation in using sounds for diagnosing problems in Internet-of-Things (IoT) device contexts in which a device listens for audio in an environment. Using audio analysis for troubleshooting is problematic due to the fact that sounds in different contexts have very different characteristics.

A domain is a specific area, location, or context in which a set of unique sounds is characterized. For example, the sounds produced by a faulty car engine may be different from the sounds produced by a faulty industrial equipment engine or the sounds produced by a microwave. As a result, the most appropriate classification techniques are different in each domain, and any single classification scheme that works well in one domain may not work well in other domains. As a result, classifying received audio often does not function properly in different contexts and environments.

In general, machine learning approaches can be used to train and adapt behavior to different constraints. However, effective machine learning techniques require appropriate training data to be used for training in the appropriate context. Obtaining clean and curated data for training is one of the most expensive and time-consuming tasks of any machine learning system.

SUMMARY

The illustrative embodiments provide a method, system, and computer program product. An embodiment includes a method including receiving, by a processor, a domain description, the domain description identifying a domain associated with a sensor input. The domain description is formatted according to a hierarchical naming structure. The embodiment further includes selecting a training data set from a plurality of training data sets based upon the received domain description and sensor input. The embodiment further includes determining a combination of a subset of classifiers for classifying the sensor input from a set of classifiers based upon the selected training data set.

In an embodiment, the sensory input is at least one audio sample monitored by an audio monitoring device in the domain. In another embodiment, the determining further includes determining a combination of a subset of audio feature extractors from a set of audio feature extractors and a subset of audio classifiers from a set of audio classifiers based upon the selected training data set.

An embodiment further includes sending an indication of the determined combination to the audio monitoring device, wherein the audio monitoring device is configured to monitor for audio signals within the domain using the determined combination of the subset of audio feature extractors and the subset of audio classifiers.

In an embodiment, the subset of audio classifiers is selected based upon an accuracy measure of each of audio classifiers. In another embodiment, the audio monitoring device is configured to classify a monitored audio signal using the subset of audio feature extractors and subset of audio classifiers, determine whether the classified audio signal meets a predetermined notification criteria, and send a notification indicative of the notification criteria to a notification device.

Another embodiment further includes sending program code configured to implement each of the subset of audio feature extractors and the subset of audio classifiers to the audio monitoring device.

In an embodiment, each of the plurality of training data sets is labeled according to a hierarchical naming structure. In another embodiment, each audio feature extractor of the set of audio feature extractors is labeled according to a hierarchical naming structure. In still another embodiment, each audio classifier of the set of audio classifiers is labeled according to a hierarchical naming structure.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
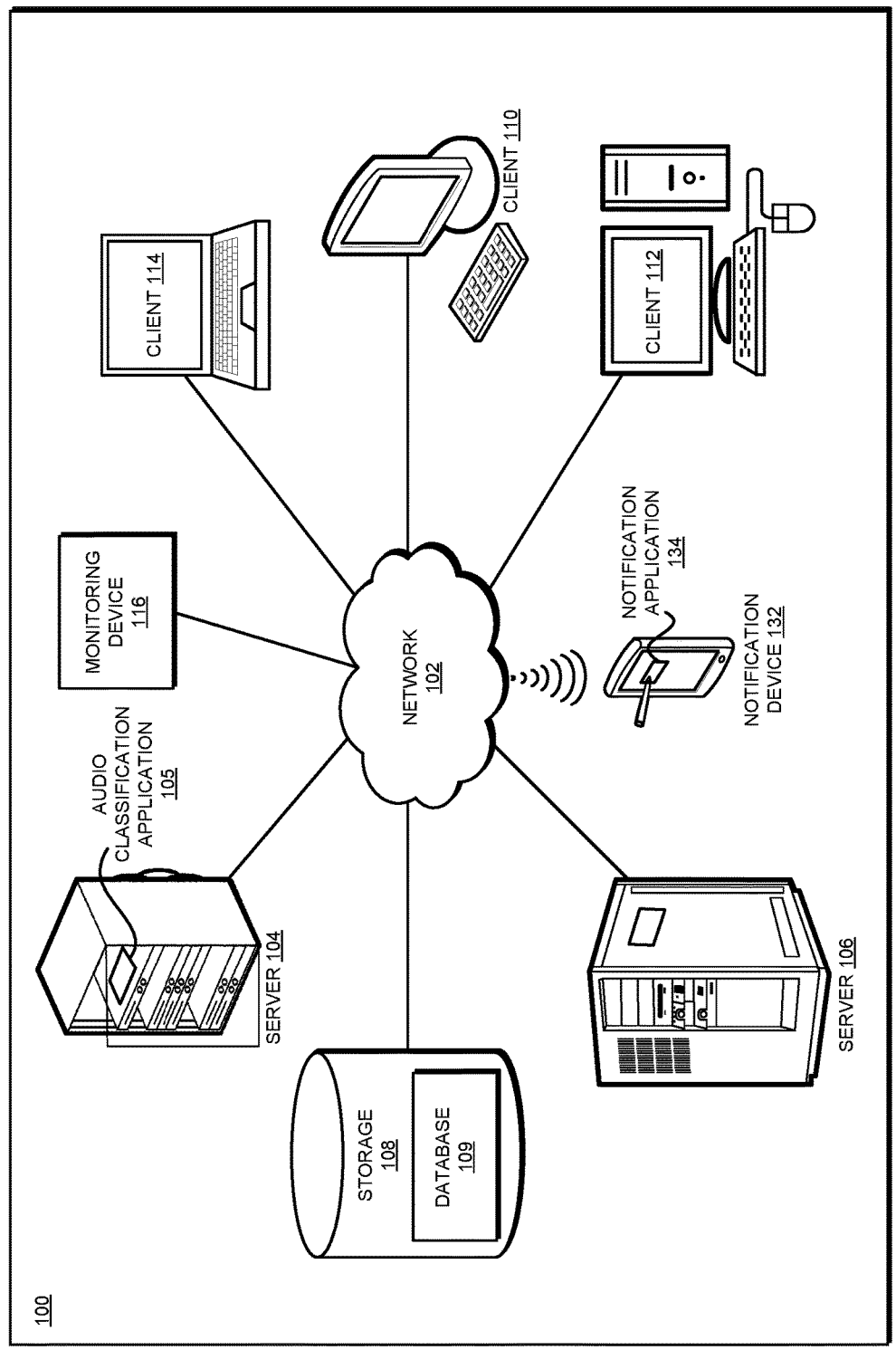
FIG. 1 depicts a block diagram of a network of data processing systems in which illustrative embodiments may be implemented.

The illustrative embodiments described herein generally relate to flexible and self-adaptive classification of received audio measurements in a network environment. In the domain of hearing, the insights that many sounds are common across many domains can be leveraged to improve classification of audio. For example, a beeping sound may be common in many different domains. Current machine learning techniques do not share training data across multiple domains, and each domain usually has its own training data. In accordance with various embodiments, the sharing of training data across domains is enabled to allow audio sounds to be automatically classified in each domain according to the most suitable approach.

An audio classifier is an algorithm or other computation procedure that is used to classify a received audio signal to identify a characteristic of the audio signal such as a cause of the audio signal. Examples of audio classifiers include, for example, a neural network to classify the audio signal, a k-means algorithm to classify the audio signal, and bag-of-words algorithm to classify the audio signal. Another technique for classifying sounds into different categories involves classifying different sounds using a system based on Hidden Markov Models (HMM). Other types of classifiers are used for classifying sounds in speech and are known in the extensive literature for speech and music analysis.

In the field of machine learning, many different classifier systems have been proposed. The limitation of any single classifier scheme is that its performance is not consistent across different domains of applications. One HMM-based classifier may be the best classifier for diagnosing sounds in the engine of an automobile of one make, while another classifier based on k-means may perform better for diagnosing sounds in the engine of an automobile of another make.

Another complexity in the diagnosis arises from the fact that different domains may require examining different audio properties or audio features in the sounds that are encountered. Audio feature extractors are used to extract certain features from an audio signal such as frequencies or temporal characteristics of an audio signal. In particular embodiments, an audio feature extractor may include software and/or hardware configured to extract one or more audio features from an audio signal. In a particular example, a feature extractor may include software to extract Fast Fourier Transform (FFT) coefficients from an audio signal. In another particular example, a feature extractor may include software to Mel-Fisher Correlation coefficients from an audio signal. Within one domain, e.g. diagnosing machine engine rooms, the dominant frequencies in the sound may be the right feature of the audio to examine. In another domain, e.g. for determining if an emergency vehicle is approaching, Doppler shift in the sound stream may become important. Since there are a large number of features associated with any sound clip, it is difficult to construct a general audio classification system that can apply to many different domains.

Another problem in the currently available schemes audio classification is that training an individual classifier to become accurate requires a large training data set labeled for a particular domain. As a result, adapting currently available schemes to a new domain is expensive and time-consuming. One or more embodiments described herein provide for an approach to audio classification in which training of classifiers can be attained with a significantly smaller set of labeled training data while maintaining a desired level of accuracy of classification.

In accordance with various embodiments, sharing of training data across audio classification techniques of different natures and domains is enabled and may be adapted to a wide variety of audio analytics domains and customizable for many different domains of application. A domain of application (or "domain") is a specific context in which a set of unique sounds are characterized. As an example, classifying sounds from a machine engine room as faulty/normal is one domain. Analyzing sounds from a washing machine to determine which of the five stages of washing is presently in progress is another example domain. Analyzing sounds from a car engine to determine the state of the engine or a component is still another example domain.

In accordance with various embodiments, an audio classification system includes an audio classification library that is embodied as a software library or as a service which is running on a cloud or data center. In a particular embodiment as a software library, the classification system may include at least three interfaces. The first interface allows a human administrator to provide configuration inputs which include at a minimum a description of the domain for which the library is being used. The second interface provides for a training interface that receives an input of a set of labeled audio clips (e.g., audio clips each of which are classified as belonging to one out of K categories). The third interface provides an unknown clip that is then classified into one of the many different categories.

In at least one embodiment, an audio classification application provides for a flexible multi-domain audio classifier that includes a number of diverse audio classifiers, each running on a diverse set of audio feature extractors. In the embodiment, an audio classification application receives information indicative of a domain in which an audio monitoring device is located. In the embodiment, based upon the indicated domain the audio classification application selects a subset of audio classifiers and a subset of audio feature extractors from a full set of available audio classifiers and audio feature extractors which operate with a desired level accuracy to combine together in an ensemble. In the embodiment, the audio classification application communicates an indication of the predetermined subset of audio classifiers and predetermined subset of audio feature extractors to the audio monitoring device.

In an embodiment, the audio monitoring device monitors for audio signals within the environment of the audio monitoring device. Upon detecting an audio signal, the audio monitoring device attempts to classify the audio signal using the selected subset of audio classifiers and the selected subset of audio feature extractors. In a particular embodiment, if the detected audio signal is classified using the selected subset of audio classifiers and the selected subset of audio feature extractors and meets predetermined criteria, the audio monitoring device sends a notification to a notification device, such as a smart phone, indicating the particular audio signal has been detected within the domain. For example, in a particular embodiment the audio monitoring device detects the sound emitted by a fire alarm and send a notification to the notification device that the fire alarm has been detected.

In one or more embodiments, each domain is described using a domain description to facilitate training and classification functions of the audio classification system. In at least one embodiment, each domain is named in a hierarchical manner using a concept of hierarchical name spaces. The hierarchical naming structure allows the domains to be structured in a hierarchical manner and allows for a domain to use sound clips from other domains in related areas for training and classification functions. In particular embodiments, the domain is described by a self-describing document. A self-describing document is a document which includes its schema (or structure definition) within itself, either directly or via reference to a common externally named schema or structure definition document.

In one or more embodiments, a domain description schema for a domain includes one or more of the following components: (a) a name of the schema; (b) a set of names for different categories in the domain; (c) a set of category equivalences—i.e. list of names for categories in other domains that would have the same characteristics as the one of the named category in the current domain; (d) any required steps for pre-filtering of information, e.g. an optional approach for background noise elimination in this domain; (e) an optional preference set for different features that can be used in the domain for classification; (f) an optional preference set for the different classifiers that would be preferred for this domain; and (g) an optional set of rules that define how the output from different domains can be combined together. In particular embodiments, the domain description is provided by means of a human being defining the document conforming to the schema. In particular embodiments, the schema can be represented in any structured format, e.g. using the format of an XML schema or a database schema.

In one or more embodiments, the audio classification application uses the domain description to identify sounds that are common across other domains, and use training data from the other domains to augment its training capability. As described above, the audio classification system may include a number of different audio feature extractors and audio classifiers. In particular embodiments, each of the feature extractors is identified by a name that follows a convention of a hierarchical naming system. Further, each of the classifiers is also similarly named using a hierarchical naming system. In one or more embodiments, the hierarchical names are used to refer to the classifiers and feature extractors in the domain description document. In particular embodiments, each of the features and classifiers that is named has an associated description which includes its schema. In particular embodiments, the description of the feature extractor includes a feature type (e.g., is the feature a single number, two dimensional point, a two dimensional set of points, a multi-dimensional point, or a set of multi-dimensional points), and an input audio types of input audio clips the feature extractor can handle. In particular embodiments, the description of each classifier includes the constraints on the types of audio features for which the audio classifier can be used. By using these descriptions, the audio feature extractors and audio classifiers become typed, and the compatibility of an audio feature with an audio classifier can be determined.

In one or more embodiments, the audio classification application receives a domain description and a pointer to a set of labeled audio training clips from the domain. The labeled audio clips provide a mapping of an audio clip to that of a label. In one or more embodiments, the audio classification application uses these pointers and information to create a set of training data which can include clips from other domains. In one or more embodiments, the consolidation of training data from many different domains can be used for machine learning systems that work on other sensor inputs beyond audio, e.g. on video clips, images, temperature readings, pressure readings and vibration readings, and can be used to augment training data that is available for classification applications using those sensory inputs. The audio classification application determines a set of audio feature extractors from all of the audio feature extractors that are compatible with the audio clip and applies the feature extractor to the feature of the audio clip associated with the feature extractor. In the embodiment, the audio classification application further identifies a set of feature extractors of all labeled features and determines the audio classifiers that are compatible with the feature extractors, and applies the audio classifiers and audio feature extractors to the audio clip. Accordingly, the audio classifier is trained and configured from the labeled data corresponding to all the features for which it is compatible. For example, if N classifiers and M feature extractors are available and all of classifiers and feature extractors are compatible, N*M virtual classifiers are obtained by applying each audio classifier to each of the audio feature extractors. If a particular classifier can use multiple features, the number of available feature-classifiers combinations are even larger.

In a training phase, the audio classification application determines the efficacy of each of the audio classifiers. Determining the efficacy of a particular audio classifier can be performed in a number of ways as is well known in the art. For example, in a particular embodiment the audio classification application divides all labeled training data into K subsets, trains the classifier on K−1 subsets, and uses the Kth subset for testing the efficacy of the classifier. In particular embodiments, an average accuracy for a particular classifier is found by testing the classifier using each of the data points as the testing data and determining an average accuracy.

In one or more embodiments, the audio classification application selects an optimal set of audio classifiers based upon the accuracy of the individual audio classifiers. In particular embodiments, the audio classification application selects a predetermined number of classifiers based up to a limit of audio classifiers found in the domain description. In still another particular embodiment, the audio classification system selects a default number of audio classifiers. In one or more embodiments, the audio classification determines an optimal way to combine the classifiers into an ensemble system of classifiers. In particular embodiments, the audio classification application determines an optimal combination of audio classifiers using a weighted voting with weight of a particular classifier corresponding to the individual accuracy of the classifier. In still other particular embodiments, the audio classification application determines an optimal combination of audio classifiers using a decision tree, another learning system, or any other suitable selection mechanism.

In one or more embodiments, audio feature extractors may use a variety of audio classification features to classify audio such as Fast Fourier Transforms (FFTs), Discrete Cosine transforms (DCTs), measures of power and/or frequency distribution, histograms of various coefficients at different time-scales, and using temporal relations between sound clips.

In an example embodiment of feature extraction and classification using frequencies at multiple time scales, an input sound clip of a predetermined length is divided into a predetermined number of samples, and frequency coefficients are calculated for a number of frequencies within each sample. Further, the audio classification application may repeat the operation on the same input sound clip using a different For example, in a first operation the audio classification application may split a 5 second audio clip into 1000 samples of 5 milliseconds, obtain frequencies coefficients for several frequencies for each of the 1000 samples, and average the coefficient for each sample of the several frequencies. Example frequency coefficients are shown as follows:

| Frequency | Coefficient |
| --- | --- |
| 200 kHz | 0.4 |
| 600 kHz | 1.3 |
| 800 kHz | 0.6 |

In a second operation, the audio classification application may split the 5 s audio clip into 100 samples of 50 ms, obtain frequencies coefficients for several frequencies for each of the 100 samples, and average the coefficient for each sample of the several frequencies. Example frequency coefficients are shown as follows:

| Frequency | Coefficient |
| --- | --- |
| 206 kHz | 0.45 |
| 580 kHz | 1.0 |
| 825 kHz | 0.65 |

In a third operation, the audio classification application may obtain frequencies coefficients for several frequencies over the entire 5 s audio clip. Example frequency coefficients are shown as follows:

| Frequency | Coefficient |
| --- | --- |
| 210 kHz | 0.35 |
| 590 kHz | 1.1 |
| 825 kHz | 0.62 |

In particular embodiments, the audio classification application may further aggregate the results of the three operations as follows:

| Frequency Range | Coefficient |
| --- | --- |
| 200-210 kHz | 0.35-0.45 |
| 580-600 kHz | 1.0-1.3 |
| 800-825 kHz | 0.6-0.65 |

In one or more embodiments, an unclassified audio clip may be classified by determining which of the classified sound has the most overlap within a number of regions of the classified sounds. In accordance with one or more embodiments, the audio classification system receives an unclassified audio clip along with a domain description, and selects only the selected audio feature extractors that are required for the audio classifiers selected during the training phase for the domain indicated in the domain description. In one or more embodiments, the audio classification system may then use the domain description to remove background noise from the audio clip, and classify the resulting clip using the audio classifiers.

In accordance with various embodiments, the audio classification system can quickly be adapted to new domains, and self-train to provide the improved accuracy in classification over time.

In other embodiments, the audio classification system can be augmented with other capabilities that aid in classification. For example, the audio classification system can associate an estimate of an estimation of probability of classification with each audio classifier, and take the accuracy into account when combining the audio classifiers into an ensemble to determine a net accuracy of the audio classification system. In another particular embodiment, when an estimation of the accuracy is attained, the audio classification system can send results with low accuracy to a human who can make a determination regarding the correct classification, and the correct classification can be sent to the audio classification system to retrain individual classifiers.

The illustrative embodiments are described with respect to certain types of audio classification systems, audio monitoring devices, training data, notification devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
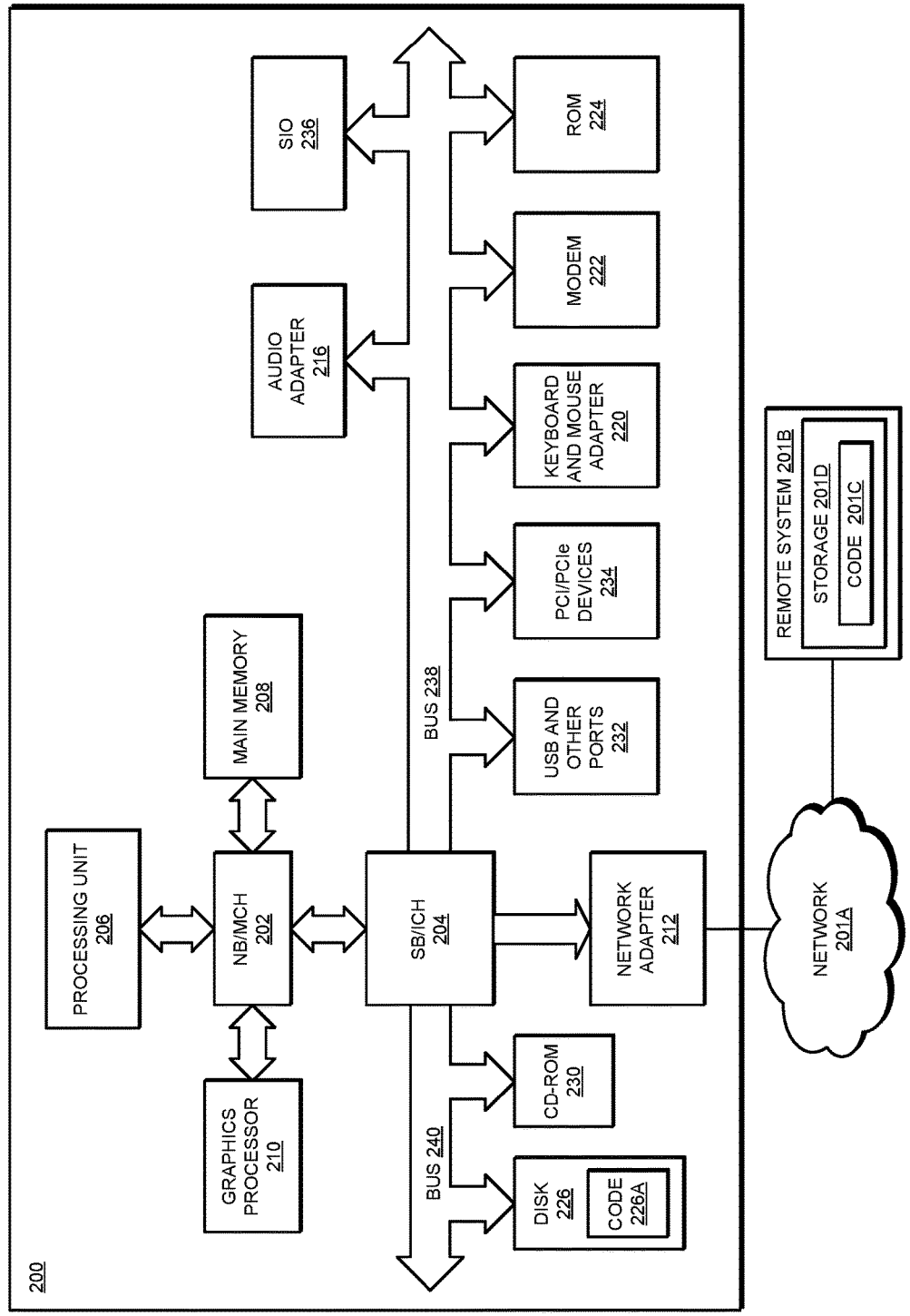
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may include a database 109 configured to store one or more of named training data, named audio feature extractors, named audio classifiers, and named domain descriptors. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Audio classification application 105 of server 104 implements an embodiment of an audio classification system configured to perform audio classification functions as described herein. Monitoring device 116 is an example of an audio monitoring device configured to monitor for audio signals within an environment or domain, sample the audio signals, and send the sampled audio signals to audio classification application 105. In particular embodiments, monitoring device 116 may be further configured to receive an indication of one or more selected audio classifiers and selected audio feature extractors from audio classification application 116, and use the selected audio classifiers and selected audio feature extractors to classify audio signals received within the environment and/or domain.

Notification device 132 is an example of a notification device described herein. Notification device 132 includes notification application 134. In one or more embodiments, notification application 134 of notification device 132 may receive a notification from monitoring device 116 via server 104 indicating that a particular sound has been detected by monitoring device 116. In some embodiments, the notification device 132 may be the same as the monitoring device 116. Any software application described as executing in another data processing system in FIG. 1 can be configured to execute in monitoring device 116 or notification device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
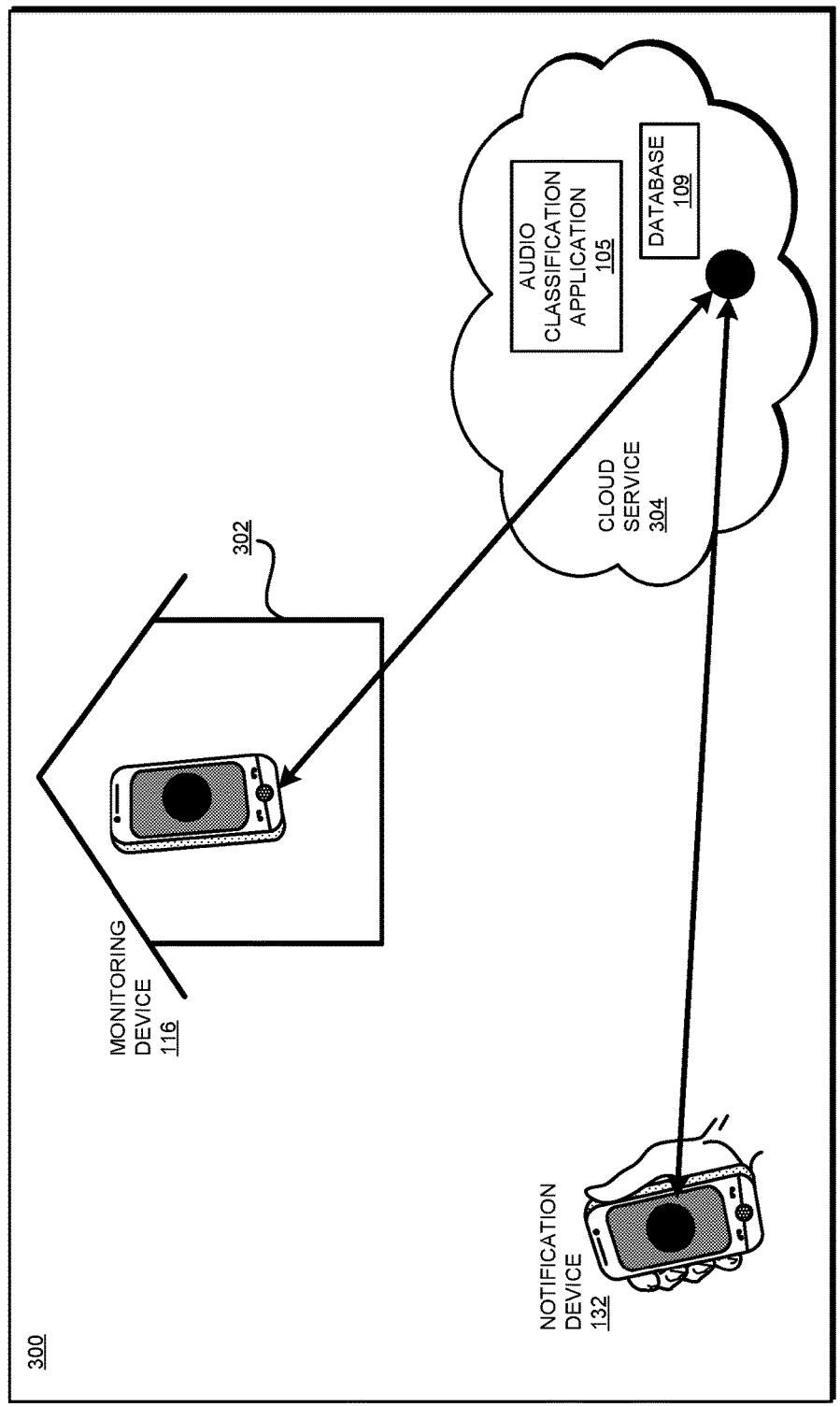
FIG. 3 depicts a block diagram of an audio classification system in which illustrative embodiments may be implemented.

With respect to FIG. 3, this figure depicts a block diagram an audio classification system 300 in which illustrative embodiments may be implemented. In the embodiment of FIG. 3, a monitoring device 116 is placed within an environment 302 and monitors for audio signals generated by sounds within environment 302. In a particular embodiment, the environment 302 includes a home. Audio classification system 105 further includes audio classification application 105 and database 109 hosted within a cloud service 304 in communication with monitoring device 302. In particular embodiments, cloud service 304 includes one or more servers such as server 104 of FIG. 1. Audio classification system 300 further includes notification device 132 in communication with cloud service 304.

In a particular example operation of audio classification system 105, when the home is vacant, monitoring device 302d device monitors the ambient noise within environment 302 when the home is vacant. If monitoring device 302 detects an audio signal that is classified by monitoring device 116 as an alert (e.g., a fire-alarm beep), monitoring device 116 sends a notification to notification device 132 to alert a user of notification device 132 of the detected alert. In particular embodiments, the user is alerted via a text message, a visual indication, or an audible indication.

In one or more embodiments, monitoring device 116 collects normal sounds within environment 302 during a base-lining period. During the base-lining period, the collected sounds and a domain description describing one or more domains of environment 302 are sent to audio classification application 105 of cloud service 304. Audio classification application 105 trains the audio classification system using the collected sounds and domain description to learn and select the best possible subsets of audio classifiers and audio feature extractors, for example, the best three audio classifiers and/or audio feature extractors) to use for detecting abnormal sounds within environment 302. In the embodiment, audio classification application 105 sends information indicative of the selected set of audio classifiers and audio feature extractors to monitoring device 116. In the embodiment, monitoring device 116 uses the selected set of audio classifiers and audio feature extractors to classify sounds detected in environment 302.

In accordance with various embodiments, audio classification system 300 can be used for monitoring of sounds in a variety of different domains such as a "Vacant House Monitoring using Sounds" domain, a "Monitoring Home Heating System using Sounds" domain, a "Monitoring Noise in BMW Engines" domain, or a "Monitoring Noise of Ford Engines" domain.

Figure 4:
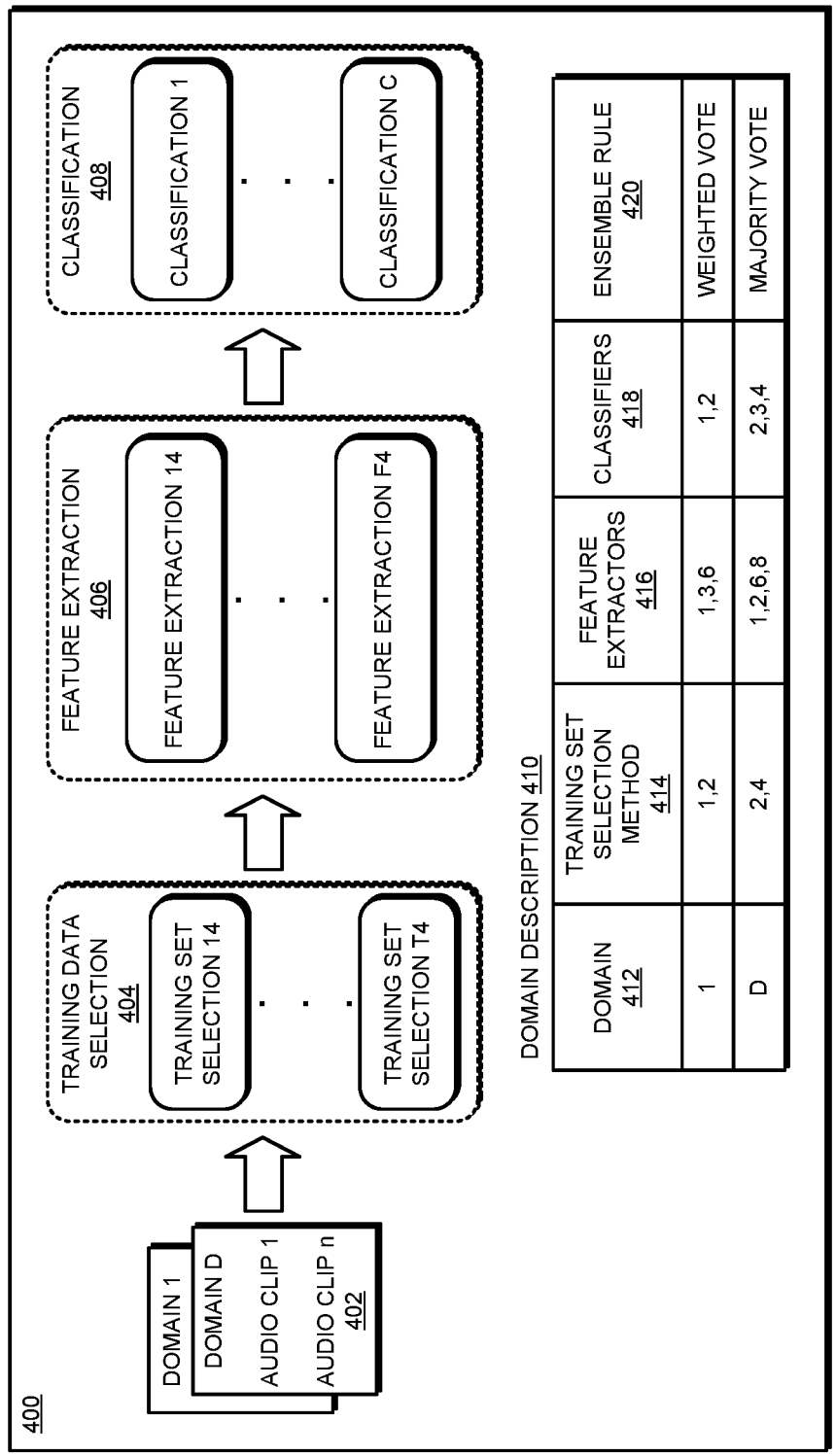
FIG. 4 depicts a block diagram of an audio classification application according to an illustrative embodiment.

With reference to FIG. 4, this figure depicts a block diagram of an audio classification application 400 according to an illustrative embodiment. In a particular embodiment, audio classification application 400 is audio classification application 105 of FIG. 1. Audio classification application 400 receives a plurality of domain descriptions 402 for domains 1 to D and a pointer to a set of labeled audio clips 1-n in which a label maps to an audio clip. Audio classification application 400 includes a training data selection module 404 configured to select one or more training sets from a plurality of training sets 1-T for each domain. Audio classification application 400 further includes a feature extraction module 406 configured to select one or more audio feature extractors from among a set of feature extractors 1-F for each domain that are compatible with the appropriate clip and apply the audio feature extractor to the audio feature of the clip associated with the feature extractor. Audio classification application 400 further includes a classifier selection module 408 configured to select one or more audio classifiers from among a set of audio classifiers 1-C compatible with the audio feature extractors. Accordingly, a domain description 410 for each domain may include a domain identifier 412, a training set selection method indicator 414 identifying one or more methods of selecting a training data set, a feature extractors indicator indicating the selected audio feature extractors, a classifier indicator indicated the selected audio classifiers, and an ensemble rule indicator indicating a rule used to generate the ensemble of selected audio feature extractors and selected audio classifiers to be used. In particular embodiments, the ensemble rule may include one or more of a weighted vote rule or a majority vote rule.

Figure 5:
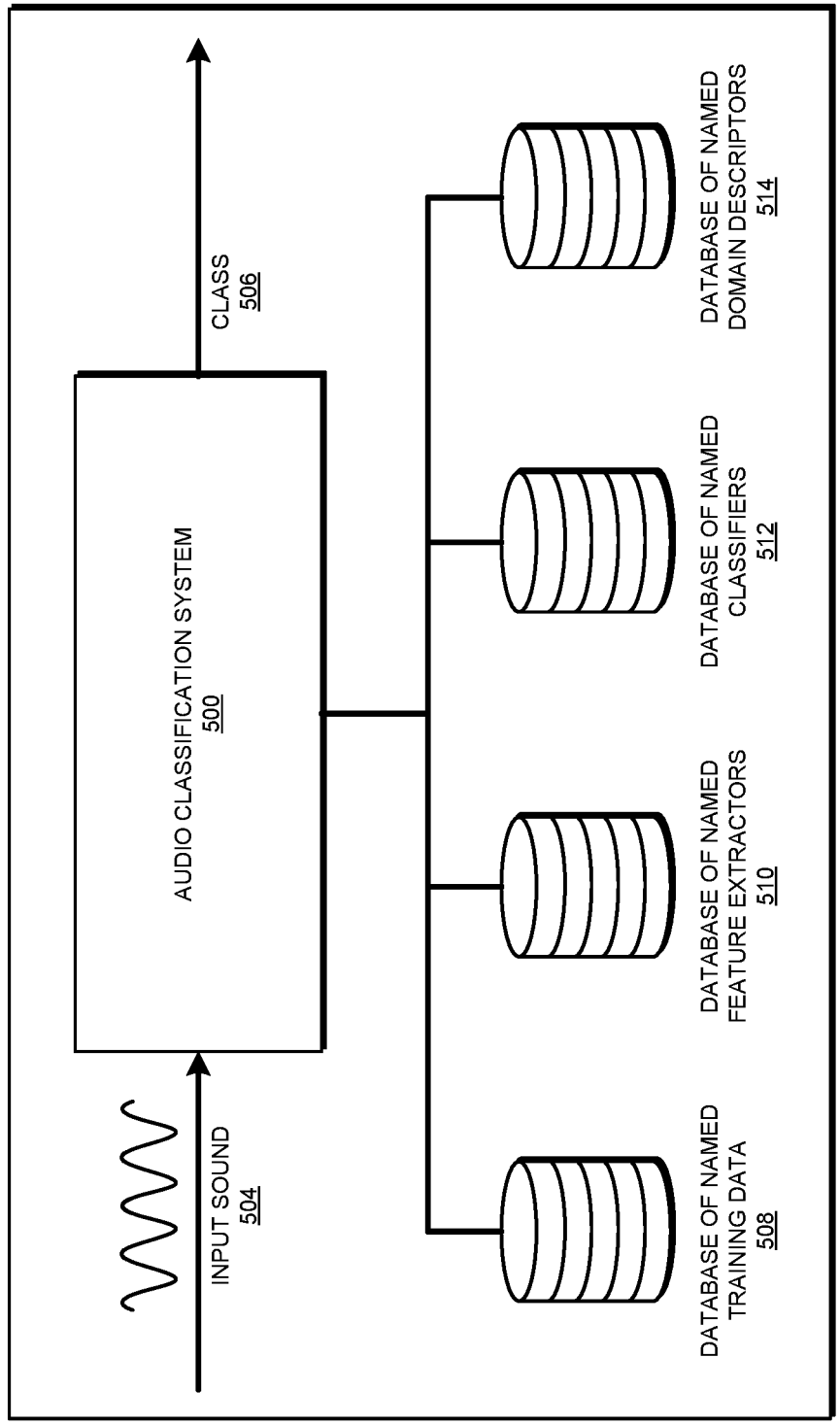
FIG. 5 depicts a block diagram of a flexible audio classification system and associated databases according to an illustrative embodiment.

With reference to FIG. 5, this figure depicts a block diagram of a flexible audio classification system 500 and associated databases according to an illustrative embodiment. In at least one embodiment, audio classification system 500 includes audio classification application 105 of FIG. 1. The audio classification system 500 is configured to receive an input sound 504, classify input sound 504, and output the classification 506 as described herein. Audio classification system 500 is in communication with a database of named training data 508, a database of named feature extractors 510, a database of named classifiers 512, and a database of named domain descriptors 514.

In one or more embodiments, each of database of named training data 508, database of named feature extractors 510, database of named classifiers 512, and database of named domain descriptors 514 utilize a hierarchical naming structure. In a particular embodiment, database of named domain descriptors 514 includes a domain of "HouseMonitoring" for each house that is monitored having a hierarchical naming structure of com/ibm/names/domain-name/audio/house-monitoring. In other particular embodiments, other domains such as an engine-room monitoring domain may be named, for example, as com/ibm/names/domain-name/audio/house-monitoring.

In a particular embodiment, database of named feature extractors 510 contains the following example names: A name of com/ibm/names/feature-extractor/audio-extractor/FFT refers to software that can extract Fast Fourier Transform coefficients; and a name of com/ibm/names/feature-extractor/audio-extractor/MFCC: refers to software that can extract Mel-Fisher Correlation coefficients.

In a particular embodiment, database of named classifiers 512 may contain the following illustrative names: a name of com/ibm/names/classifier//NN refers to software that can uses neural networks to classify information; a name of /ibm/names/classifier/K-means: refers to software that can use a k-means algorithm to classify information; and a name of /ibm/names/classifier/BoW refers to software that can use a bag of words algorithm to classify information.

In a particular embodiment, database of named training sets 508 may contain the following illustrative names: a name of com/ibm/names/training-data/audio/house1-basline refers to sounds that are considered normal for house#1; a name of com/ibm/names/training-data/audio/house34-basline refers to sounds that are considered normal for house#34; a name of com/ibm/names/training-data/audio/door-bell refers to sounds that are typical of door-bells; a name of com/ibm/names/training-data/audio/fire-alarm refers to sounds that are typical of fire-alarms; and a name of com/ibm/names/training-data/audio/beeps refers to sounds that are different types of beeps.

Figure 6:
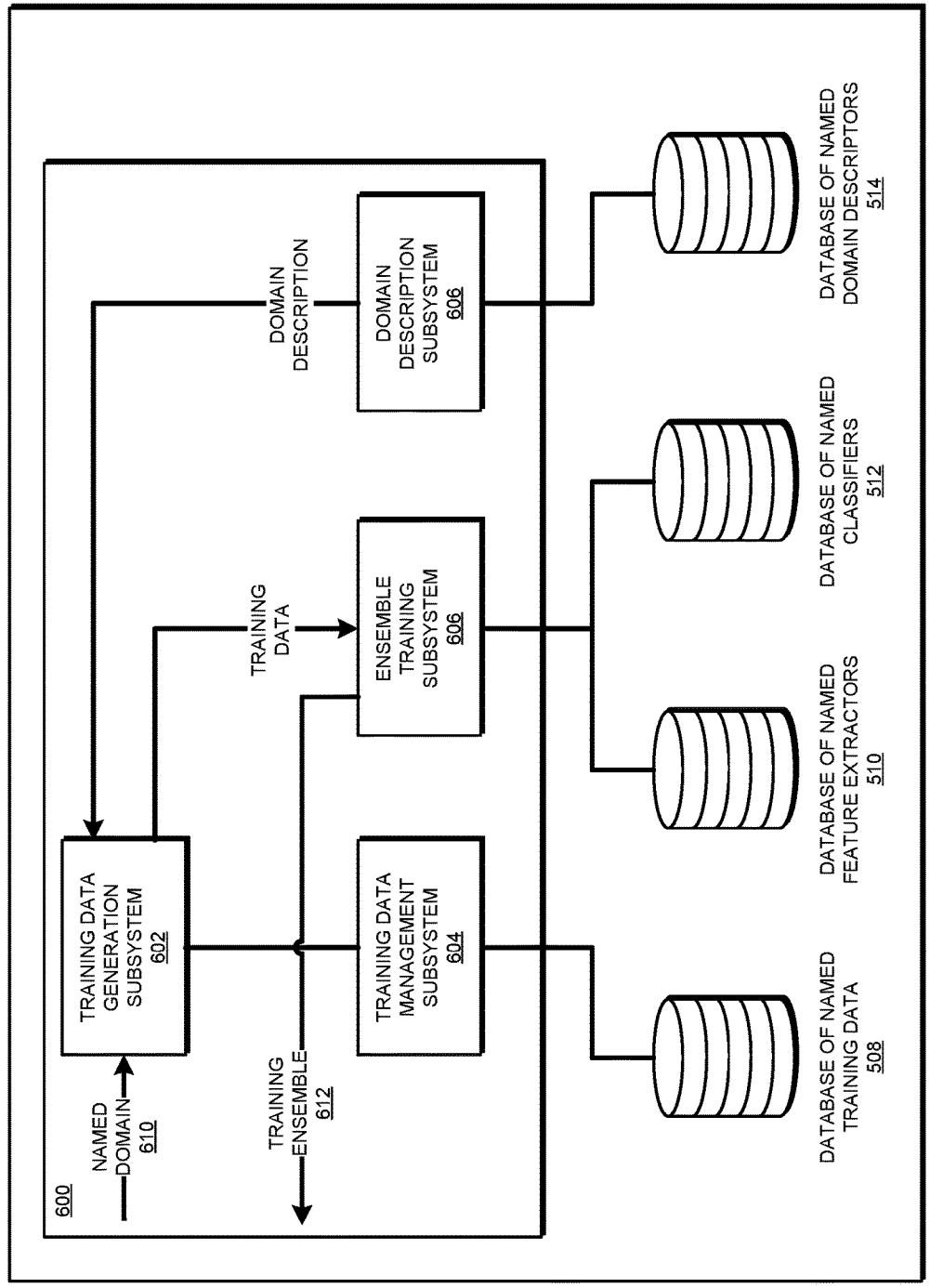
FIG. 6 depicts a block diagram of a flexible audio classification system and associated databases according to another illustrative embodiment.

With reference to FIG. 6, this figure depicts a block diagram of a flexible audio classification system 600 and associated databases according to another illustrative embodiment. In the embodiment, audio classification system 600 includes a training data generation subsystem 602, a training data management subsystem 604, an ensemble training subsystem 606, and a domain description subsystem 608. A named domain 610 is received by training data generation subsystem 602, and training data generation subsystem 602 looks up the domain description associated with the named domain from database of named domain descriptors 504. In particular embodiments, domain description subsystem 608 functions as an interface between training data generation subsystem 602 and database of named domain descriptors 514 to facilitate lookup of the domain description.

In the embodiment, training data generation subsystem 602 generates training data from database of named training data 508 and provides the training data to ensemble training subsystem 606. In an embodiment, the training data generation subsystem generates the training data from combining several samples from the database of named training data 508, and combines samples from many different domains. The training data generation system 602 can also be used to generate training data for sensor inputs that are not audio. In particular embodiments, training data management subsystem 604 functions as an interface between database of named training data 508 and training generation subsystem 602 to facilitate providing of the training data from database of named training data 508 to training data subsystem 602. In particular embodiments, training data generation subsystem 602 uses previously stored training data, e.g. beeps or alarms from previous measurements, and combines the previously stored training data with current baselining data from a domain to generate the training data.

Ensemble training subsystem 606 receives the training data from training data generation subsystem 602 and trains an ensemble of named audio feature extractors and named audio classifiers to generate a training ensemble 612. In particular embodiments, ensemble training subsystem 606 initially looks up all relevant named audio feature extractors and audio classifiers, and forms them into an ensemble in which each audio feature extractor is operable with each compatible audio classifier.

Figure 7:
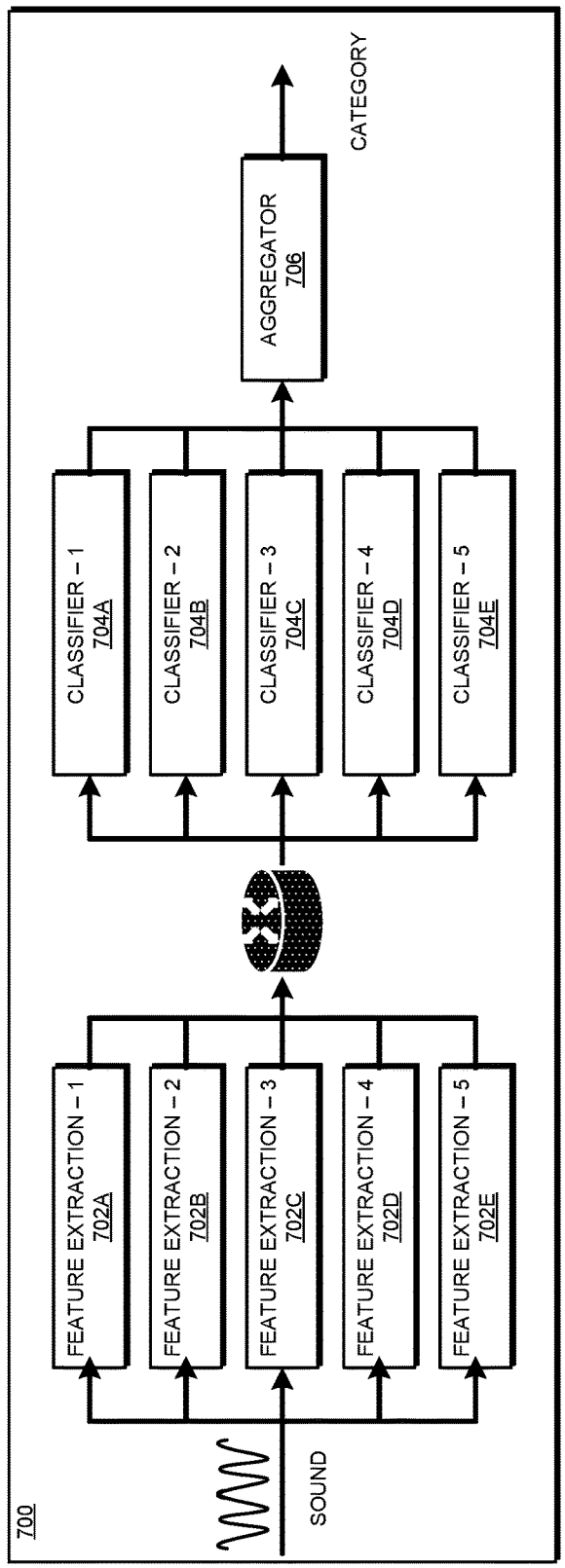
FIG. 7 depicts a block diagram of a training ensemble according to an illustrative embodiment.

With reference to FIG. 7, this figure depicts a block diagram of a training ensemble 700 according to an illustrative embodiment. Training ensemble 700 includes a plurality of feature extractors 702A-702E and a plurality of classifiers 704A-704E that are interoperable with one another. An aggregator 706 determines an optimal combination of the best K (e.g., K=3) audio feature extractors and audio classifiers as a training ensemble 612. Since each audio feature extractor and audio classifier is named in an associated database, he names of each audio feature extractor may be associated with a description as to the audio classifiers the audio feature extractor is compatible with.

Referring again to FIG. 6, in particular embodiments ensemble training subsystem 606 sends an indication of the selected audio feature extractors and selected audio classifiers of the training ensemble 612 to monitoring device 116. In one or more embodiments, monitoring device 116 uses only the selected audio feature extractors and selected audio classifiers to perform monitoring within the domain. In particular embodiments, monitoring device 116 uses the names of the selected audio feature extractors and selected audio classifiers to retrieve and install the required program code to implement the selected audio feature extractors and selected audio classifiers within monitoring device 116.

Figure 8:
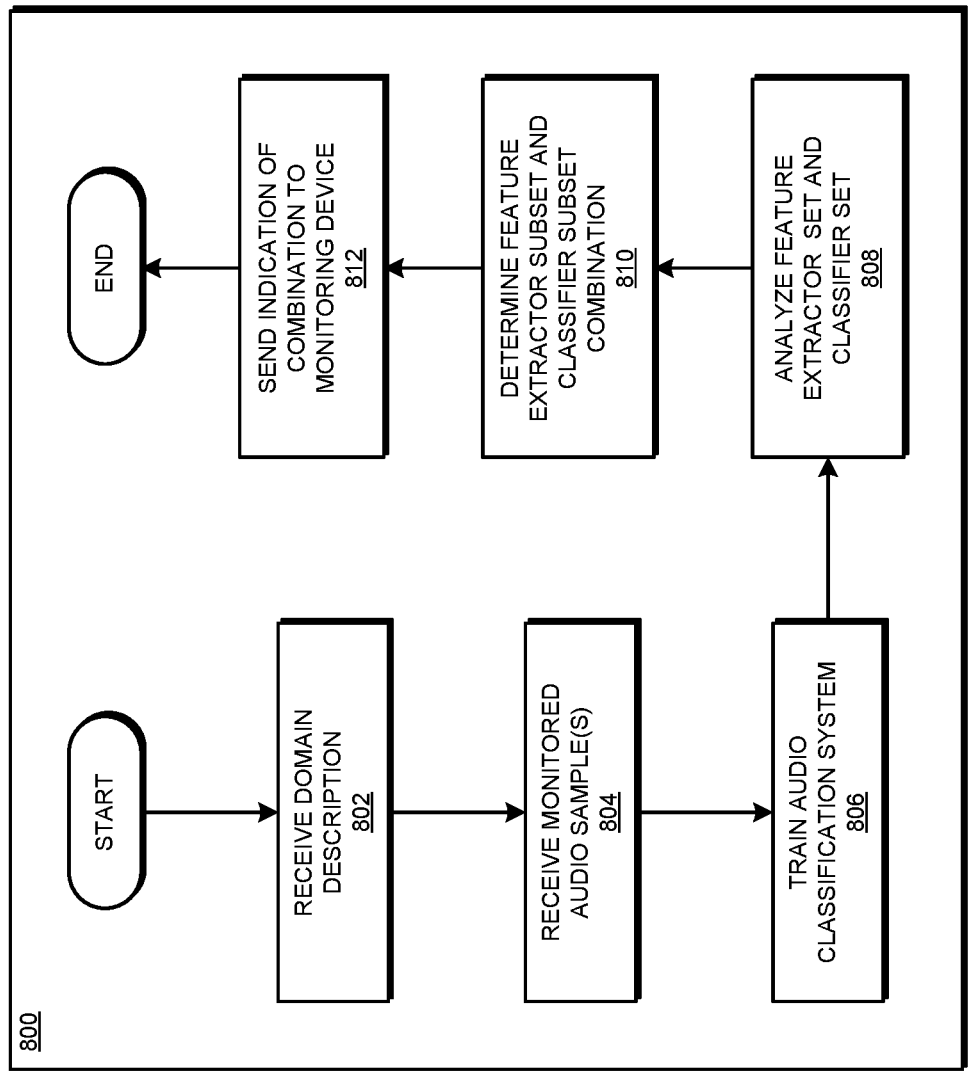
FIG. 8 depicts a flowchart of an example process associated with an audio classification application.

With reference to FIG. 8, this figures depicts a flowchart of an example process 800 associated with audio classification application 105. In block 802, audio classification application 105 receives a domain description from monitoring device 116 indicating a domain that is desired to be monitored within an environment of monitoring device 116. In block 804, audio classification application 105 receives one or more monitored audio samples from monitoring device 116. In block 806, audio classification application 105 trains audio classification application 105 based upon the received domain description and monitored audio signals using previously stored training data from database of training data 508.

In block 808, audio classification application 105 analyzes an audio feature extractor set and an audio classifier set in order to determine an optimal combination of audio feature extractors and audio classifiers for the domain. In block 810, audio classification application 105 determines a combination of an audio feature extractor subset and an audio classifier subset. In 812, audio classification application 105 sends an indication of the combination of the audio feature extractor subset and audio classifier subset to monitoring device 116. Process 800 then ends.

Figure 9:
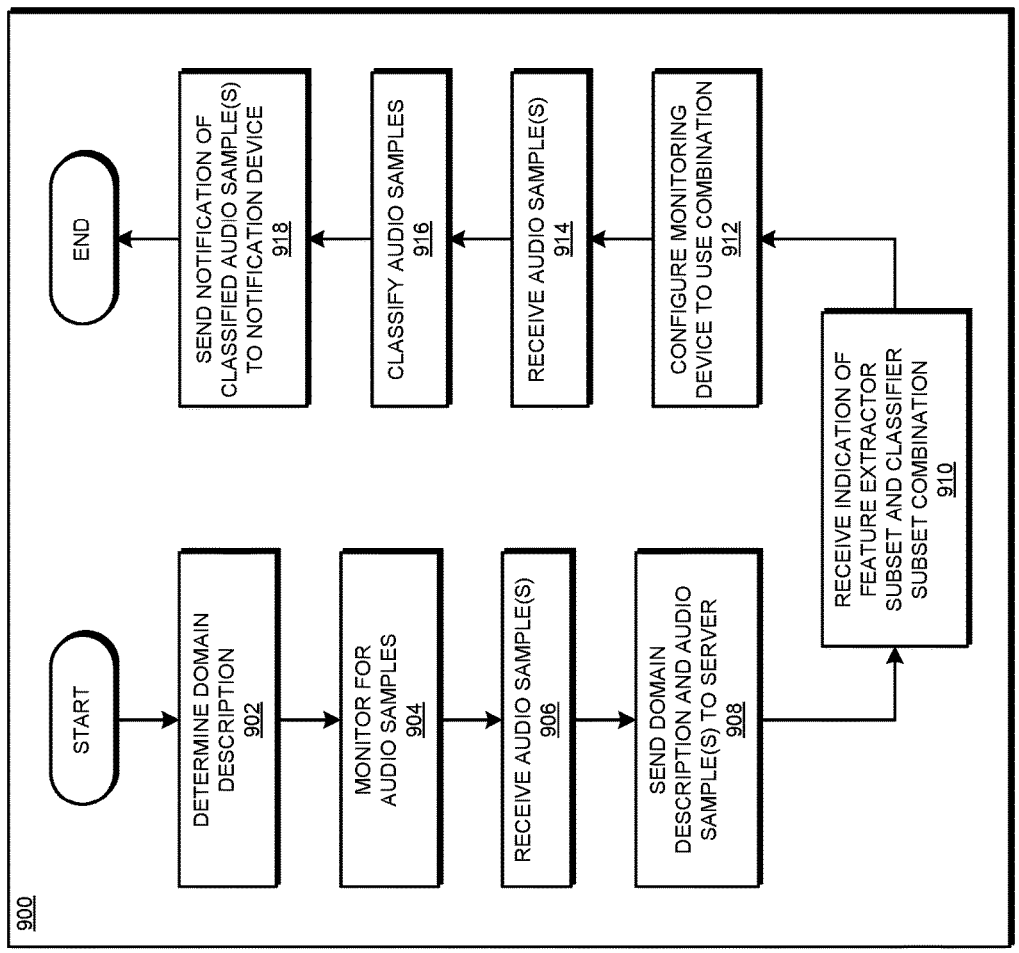
FIG. 9 depicts a flowchart of an example process associated with a monitoring device.

With reference to FIG. 9, this figures depicts a flowchart of an example process 900 associated with monitoring device 116. In block 902, monitoring device 116 determines a domain description for a domain that is desired to be monitored by monitoring device 116. In particular embodiments, monitoring device 116 determines the domain description in response to a user input. In block 904, monitoring device 116 monitors for audio samples within the domain. In block 906, monitoring device 116 receives one or more audio sample(s) of sounds detected by monitoring device 116. In block 908, monitoring device 116 sends the domain description and the audio samples to audio classification application 107. In one or more embodiments, audio classification application 107 determines a combination of an audio feature extractor subset and an audio classifier subset to be used to monitor for sounds within the domain.

In block 910, monitoring device 116 receives an indication of the feature extractor subset and classifier subset combination from audio classification application 107. In block 912, monitoring device 116 is configured to use the feature extractor subset and classifier subset combination to monitor for sounds within the domain. In particular embodiments, monitoring device 116 requests program code configured to implement each of the feature extractors from the feature extractor subset and each classifier of the classifier subset from audio classification application 107, and install the program code within a memory.

In block 914, monitoring device 116 receives one or more audio samples as a result of monitoring for sounds within the domain. In block 916, monitoring device 116 classifies the audio samples using the audio feature subset and feature extractor subset.

In block 918, if the classified audio samples meet predetermined notification criteria, monitoring device 116 sends a notification indicative of the notification criteria to notification device 132. In a particular embodiment, the notification criteria may include the detection of the sound of a fire alarm, and the notification includes an indication of detection of the sound of the fire alarm. Process 900 then ends.

In one or more embodiments, the hierarchical naming structure within domain descriptors allows for a new domain, such as training for dangerous sounds at home, to refer to an existing set of sounds in another domain, e.g. training for beeping sounds in an engine room, and use the set of beeping sounds collected from the engine room as a component for incorporating the training data from existing components.

In one or more embodiments, the naming of domains in a hierarchical manner allows domains to be crossed referenced with each other to improve training. In a particular embodiment, each training data set has an associated name which is obtained by combining the original domain name and an optional label of the training data in the new domain. This provides a hierarchical naming structure, and allows other domains to reference to the training data for the other domains own labels (possibly using different names). For example, beeping sounds used for one domain, e.g. household signals, can use the label of "beeps", while beeping sounds used for another domain can use the label of "bleeps"—whereas both refer to the same data set. Similarly, in particular embodiments a hierarchical naming scheme is also used for audio classifiers and feature extractors. One advantage in at least one embodiment of using a hierarchical naming scheme is to allow coordination of training data that is maintained in different geographically distributed locations using technologies such as Information-Centric Networking (ICN) or Named-Data Networking (NDN).

Although various embodiments are described with respect to performing operations within a neural network, it should be understood that the principles described herein may be applied to any suitable prediction networks performed by a computer system or other electronic device.

Thus, a computer implemented method, system or apparatus, and computer program product are provided in the illustrative embodiments for operations with a neural network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving, by a processor, a domain description from an audio monitoring device, the domain description identifying a domain associated with a sensor input of the audio monitoring device, wherein the domain description is formatted according to a hierarchical naming structure;
    receiving the sensor input from the audio monitoring device, the sensor input including at least one audio sample monitored by the audio monitoring device in the domain;
    selecting a training data set from a plurality of training data sets based upon the received domain description and sensor input;
    determining a combination of a subset of classifiers for classifying the sensor input from a set of classifiers based upon the selected training data set, wherein the determining further includes determining a combination of a subset of audio feature extractors from a set of audio feature extractors and a subset of audio classifiers from a set of audio classifiers based upon the selected training data set; and
    sending an indication of the determined combination to the audio monitoring device, wherein the audio monitoring device is configured to monitor for audio signals within the domain using the determined combination of the subset of audio feature extractors and the subset of audio classifiers.

2. The method of claim 1, wherein the subset of audio classifiers is selected based upon an accuracy measure of each of audio classifiers.

3. The method of claim 1, wherein the audio monitoring device is configured to classify a monitored audio signal using the subset of audio feature extractors and subset of audio classifiers, determine whether the classified audio signal meets a predetermined notification criteria, and send a notification indicative of the notification criteria to a notification device.

4. The method of claim 1, further comprising sending program code configured to implement each of the subset of audio feature extractors and the subset of audio classifiers to the audio monitoring device.

5. The method of claim 1, wherein each of the plurality of training data sets is labeled according to a hierarchical naming structure.

6. The method of claim 1, wherein each audio feature extractor of the set of audio feature extractors is labeled according to a hierarchical naming structure.

7. The method of claim 1, wherein each audio classifier of the set of audio classifiers is labeled according to a hierarchical naming structure.

8. A computer usable program product comprising one or more computer-readable storage devices, and program instructions stored on at least one of the one or more storage devices, the stored program instructions comprising:
    program instructions to receive, by a processor, a domain description from an audio monitoring device, the domain description identifying a domain associated with a sensor input of the audio monitoring device, wherein the domain description is formatted according to a hierarchical naming structure;
    program instructions to receive the sensor input from the audio monitoring device, the sensor input including at least one audio sample monitored by the audio monitoring device in the domain;
    program instructions to select a training data set from a plurality of training data sets based upon the received domain description and sensor input;
    program instructions to determine a combination of a subset of classifiers for classifying the sensor input from a set of classifiers based upon the selected training data set, wherein the determining further includes determining a combination of a subset of audio feature extractors from a set of audio feature extractors and a subset of audio classifiers from a set of audio classifiers based upon the selected training data set; and
    program instructions to send an indication of the determined combination to the audio monitoring device, wherein the audio monitoring device is configured to monitor for audio signals within the domain using the determined combination of the subset of audio feature extractors and the subset of audio classifiers.

9. The computer usable program product of claim 8, wherein the subset of audio classifiers is selected based upon an accuracy measure of each of audio classifiers.

10. The computer usable program product of claim 8, wherein the audio monitoring device is configured to classify a monitored audio signal using the subset of audio feature extractors and subset of audio classifiers, determine whether the classified audio signal meets a predetermined notification criteria, and send a notification indicative of the notification criteria to a notification device.

11. The computer usable program product of claim 8, wherein the computer usable code is stored in a computer readable storage device in a data processing system, and wherein the computer usable code is transferred over a network from a remote data processing system.

12. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, by a processor, a domain description from an audio monitoring device, the domain description identifying a domain associated with a sensor input of the audio monitoring device, wherein the domain description is formatted according to a hierarchical naming structure;

program instructions to receive the sensor input from the audio monitoring device, the sensor input including at least one audio sample monitored by the audio monitoring device in the domain;

program instructions to select a training data set from a plurality of training data sets based upon the received domain description and sensor input;

program instructions to determine a combination of a subset of classifiers for classifying the sensor input from a set of classifiers based upon the selected training data set, wherein the determining further includes determining a combination of a subset of audio feature extractors from a set of audio feature extractors and a subset of audio classifiers from a set of audio classifiers based upon the selected training data set; and program instructions to send an indication of the determined combination to the audio monitoring device, wherein the audio monitoring device is configured to monitor for audio signals within the domain using the determined combination of the subset of audio feature extractors and the subset of audio classifiers.

\* \* \* \* \*